(12) United States Patent
Persson et al.

(10) Patent No.: US 8,874,899 B1
(45) Date of Patent: Oct. 28, 2014

(54) PREMIUM SERVICES AUTHENTICATION

(75) Inventors: Carl J. Persson, Olathe, KS (US); Lyle T. Bertz, Lee's Summit, MO (US); Robin D. Katzer, Olathe, KS (US); James W. Norris, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 602 days.

(21) Appl. No.: 13/005,859

(22) Filed: Jan. 13, 2011

(51) Int. Cl.
*G06F 21/00* (2013.01)
*G06F 21/10* (2013.01)

(52) U.S. Cl.
CPC ............................... *G06F 21/10* (2013.01)
USPC ........................................................ 713/155

(58) Field of Classification Search
CPC ....................................................... G06F 21/10
USPC ........................................................ 713/155
See application file for complete search history.

(56) References Cited

U.S. PATENT DOCUMENTS

| | | | |
|---|---|---|---|
| 6,742,126 B1* | 5/2004 | Mann et al. | 726/5 |
| 2002/0184235 A1* | 12/2002 | Young et al. | 707/104.1 |
| 2006/0171390 A1* | 8/2006 | La Joie | 370/390 |
| 2007/0120965 A1* | 5/2007 | Sandberg et al. | 348/14.08 |
| 2007/0136205 A1* | 6/2007 | Przybilla | 705/54 |
| 2008/0109307 A1* | 5/2008 | Ullah | 705/14 |
| 2008/0289025 A1* | 11/2008 | Schneider | 726/10 |
| 2009/0249405 A1* | 10/2009 | Karaoguz et al. | 725/62 |
| 2009/0249406 A1* | 10/2009 | Gordon et al. | 725/62 |
| 2009/0249413 A1* | 10/2009 | Karaoguz et al. | 725/105 |
| 2009/0249422 A1* | 10/2009 | Chen et al. | 725/116 |
| 2009/0249424 A1* | 10/2009 | Gordon et al. | 725/118 |
| 2009/0298514 A1* | 12/2009 | Ullah | 455/456.5 |
| 2010/0172253 A1* | 7/2010 | Morita | 370/252 |
| 2010/0235550 A1* | 9/2010 | Bolton et al. | 710/62 |
| 2010/0284668 A1* | 11/2010 | Knight | 386/248 |
| 2011/0003582 A1* | 1/2011 | Park et al. | 455/411 |

OTHER PUBLICATIONS

Schneier, "Applied Cryptograph", 1996, Wiley and Sons, pp. 28-34.*
Schneier, "Applied Cryptography", 1996, pp. 30-31, and 181-182.*
Horn et al.; Authentication protocols for mobile network environment value-added services; Vehicular Technology, IEEE Transactions on (vol. 51, Issue: 2 ); Mar. 2002; pp. 383-392; IEEE Xplore.*
Suzuki et al.; A System for End-to-End Authentication of Adaptive Multimedia Content; Communications and Multimedia Security IFIP—The International Federation for Information Processing vol. 175, 2005, pp. 237-249; Springer US.*

* cited by examiner

Primary Examiner — Bradley Holder

(57) ABSTRACT

Methods, systems, and computer-readable media are provided for a processing an application-authentication request originating from a mobile device. In particular, an application-authentication request comprises user information that is analyzed by an authentication server. The authentication server generates a call to a subscription profile server to validate the user information as belonging to a user profile that is in good standing. In response to determining that the application-authentication request is valid, the authentication server generates an authentication cookie that is provided to the mobile device. Accordingly, the authentication cookie is used by the mobile device to access applications, such as premium services.

12 Claims, 7 Drawing Sheets

PREMIUM SERVICES AUTHENTICATION

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features or essential features of the claimed subject matter, nor is it intended to be used as an aid in isolation to determine the scope of the claimed subject matter.

Premium services are a strong source of revenue for network service providers. For example, premium movies and television shows may be sold to customers on an on-demand basis. However, authentications to purchase these premium services generally require certificates that are not able to be supported on some short-range wireless networks such as those known in the art as Wi-Fi® networks. As such, it would be beneficial to provide an authentication service that is supported on these short-range wireless networks that are unable to support certificates.

In a first aspect, a set of computer-useable instructions facilitate a method of processing an application-authentication request originating from a mobile device. The method comprises receiving an application-authentication request from a mobile device. The application-authentication request is received at a session manager. The application-authentication request comprises encrypted user information. The method also comprises providing the application-authentication request to an authentication server. Additionally, the method comprises receiving an authentication cookie and a mapping of the authentication cookie from the authentication server. The authentication cookie is generated at the authentication server based on the authentication server decrypting the user information and receiving validation of the user information from a subscriber profile server.

The method also comprises storing the mapping of the authentication cookie in association with an IP address of the application-authentication request. Further, the method comprises providing the authentication cookie to the mobile device. The method also comprises receiving an application request from the mobile device, wherein the application request comprises the authentication cookie. Additionally, the method comprises determining that the authentication cookie and an Internet Protocol (IP) address of the application request matches the authentication cookie that has its mapping stored in association with the IP address of the application-authentication request. The method also comprises providing the application request to an application gateway to process the application request.

In a second aspect, a set of computer-useable instructions facilitate a method of processing an application-authentication request originating from a mobile device. The method comprises receiving, at an authentication server, an application-authentication request. The authorization request comprises encrypted user information. The method also comprises decrypting the encrypted user information using an application key associated with the application-authentication request. Additionally, the method comprises sending an authentication request to a subscription profile server. The authentication request comprises the user information.

The method also comprises receiving a response from the subscription profile server that validates the user information is associated with a user profile stored at the subscription profile server. Further, the method comprises generating a cookie and a mapping of the cookie based on the response from the subscription profile server that validates the user information. The method also comprises providing the cookie to the mobile device. Additionally, the method comprises providing the mapping of the cookie to a session manager to authenticate a subsequent application request from the mobile device.

In a third aspect, a set of computer-useable instructions facilitate a method of processing an application-authentication request originating from a mobile device. The method comprises receiving an application-authentication request from a mobile device. The application-authentication request comprises encrypted user information. The method also comprises providing the application-authentication request to an authentication server. Additionally, the method comprises receiving an authentication cookie and a mapping of the authentication cookie from the authentication server. The authentication cookie is generated at the authentication server based on the authentication server decrypting the user information and receiving validation of the user information from a subscriber profile server.

The method also comprises storing the mapping of the authentication cookie in association with an IP address of the application-authentication request as an authentication key. Further, the method comprises providing the authentication cookie to the mobile device. The method also comprises receiving an application request from the mobile device, wherein the application request comprises the authentication cookie. Additionally, the method comprises determining that the authentication cookie and an IP address of the application request matches the authentication key. Further, the method comprises providing the application request to the third-party application. The method also comprises receiving services from the third-party application in response to the application request. Additionally, the method comprises providing the services to the mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
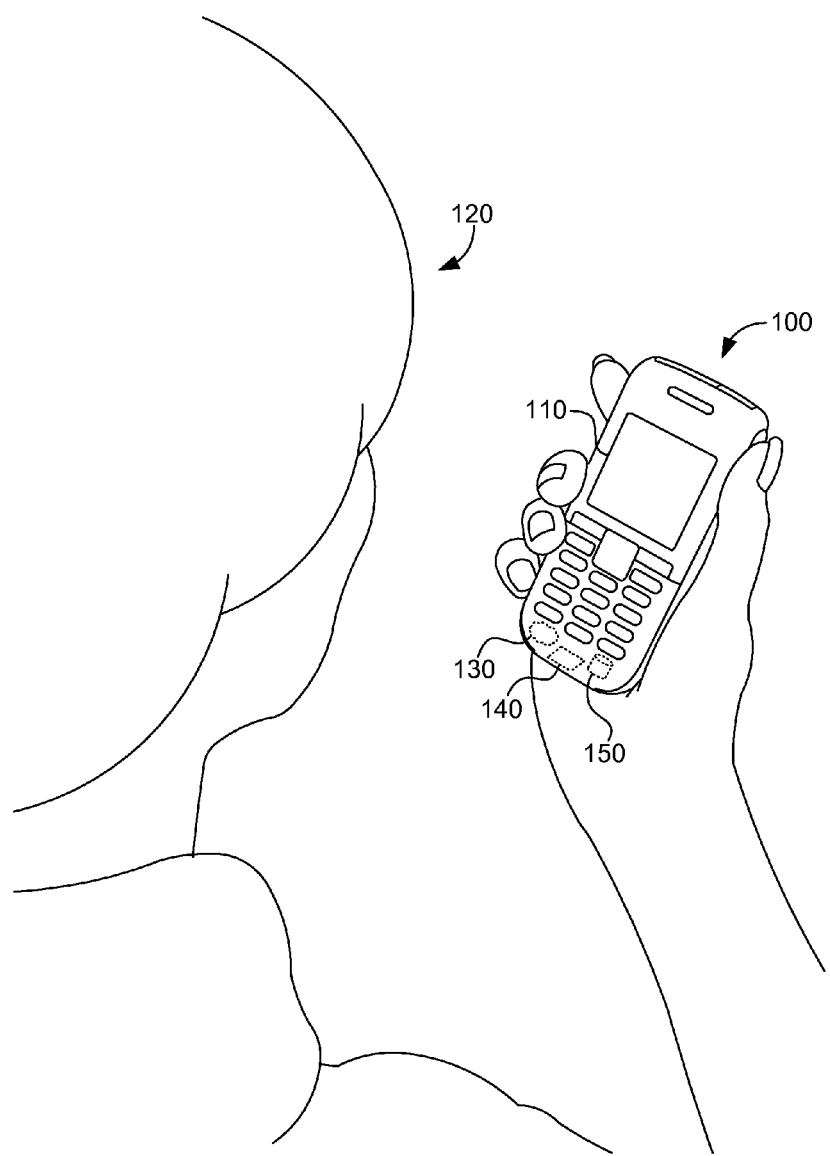
FIG. 1 is an illustrative mobile device, in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CD Compact Disc
CD-ROM Compact Disk Read Only Memory
DVD Digital Versatile Discs
EEPROM Electrically Erasable Programmable Read Only Memory
ESN Electronic Serial Number
IP Internet Protocol
MAG Media Access Gateway
MP3 MPEG-1 Audio Layer 3
NAI Network Address Identifier
PC Personal Computer
PDA Personal Digital Assistant
RAM Random Access Memory
ROM Read Only Memory
SPS Subscription Profile Server
VOG Video Optimization Gateway Further, various technical terms are used throughout this description. An illustrative resource that fleshes out various aspects of these terms can be found in Newton's Telecom Dictionary by H. Newton, 25th Edition (2009).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The data on the media can be stored momentarily, temporarily, or permanently.

In some embodiments, systems, methods, and computer-readable media for authenticating an application request originating from a mobile device are provided. In particular, claimed embodiments of the present invention authenticate an application request received from a mobile device of a user without the use of certificates. As such, methods described herein can be used to authenticate application requests over short-range wireless connections such as Wi-Fi®. In particular, user information is encrypted and sent with an application request from a mobile device. The user information is then sent through a session manager to an authentication server, where the user information is decrypted. Further, the user information is assessed against information stored at a subscriber profile server in order to authenticate the user information as being associated with a user profile that is in good standing.

Network service providers generate a significant amount of revenue from sales of premium services, such as pay-per-movies and pay-per-television shows. In particular, clients of a network service provider may pay an additional fee to gain access to premium service. In some cases, clients are authenticated through the use of certificates. However, some telecommunications technologies are not able to process certificates when authenticating a client for premium services. As such, it is beneficial for network service providers to allow clients to become authenticated using methods that do not require the use of certificates.

Currently, user information of network service provider clients may be stored at a subscription profile server (SPS). User information stored at an SPS may include a network address identifier (NAI) and electronic serial number (ESN) associated with a network service provider subscription associated with a mobile device. Further, the SPS may store information related to whether an account associated with a mobile device is in good standing (e.g., has no outstanding debts). As such, when an application-authentication request is received from a mobile device, the user information within the request may be checked against the SPS to determine whether the user information from the request is consistent with the user information stored at the SPS. Additionally, the user information from the request may be checked to determine whether the user associated with the request is in good standing.

Further, in order to protect the user information during the transmission of the request, the user information may be encrypted at the mobile device of the user. In particular, the user information may be encrypted using an application encryption key that is based on the application-authentication request from the user. As such, the user may send the application-authentication request with an application authentication header and an IP address of the application-authentication request as the origin of the application-authentication request. The request may be received at a session manager that forwards the application-authentication request to an authentication server. At the authentication server, a decryption key associated with the application of the application authorization header may be used to decrypt the user information. The user information may then be checked against user information stored in the SPS as described above.

Once the application-authentication request has been determined to be legitimate, an authentication cookie may be generated at the authentication server. The authentication cookie may be included in a response to the session manager. In particular, the authentication cookie may be within the response and a mapping of the authentication cookie may be added to the proxy authorization header of the response.

When the response is received at the session manager, the mapping of the authentication cookie may be stripped from the response. Further, the mapping of the authentication cookie may be stored in association with the IP address of the application-authentication request. In particular, the mapping of the authentication cookie may be concatenated with the IP address of the application-authentication request. In this way, the authentication cookie-IP address concatenation may be used as an authentication key that identifies a subsequent application request from the mobile device as being legitimate. In embodiments, the authentication key may only be valid for a threshold amount of time, such as 180 seconds.

The modified response is then sent to the mobile device. At the mobile device, the authentication cookie is then stored temporarily on the mobile device while an application request is generated. Once the application request is generated, the application request may be sent to the session manager. The application request may include the authentication cookie. When the application request is received at the session manager, the authentication cookie and IP address of the application request may be checked against authentication keys stored at the session manager.

If the application request is received within the pre-defined time window during which the authentication key is valid, the session manager will match the authentication cookie and the IP address of the application request to the authentication cookie-IP address concatenation stored at the session manager. As such, the session manager will strip the authentication cookie from the application request and will insert a header, such as a proxy header, to direct the application request to a third-party application via an application gateway. In particular, the session manager may direct the application request to the third-party application associated with the application request.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a PDA. This description does not intend to convey bright-line distinctions between the different types of mobile devices. Indeed, what one might refer to as a PDA, another might refer to as a mobile device or cell phone or even a PC.

Mobile device 100 may include a user interface 110, a user 120, application 130, memory 140, and data structure 150. Generally, user interface 110 provides an input/output (I/O) interface that user 120 may engage to interact with device 100. For example, user interface 110 may include a touch screen that a user may scratch or touch to interact with device 100. This interaction may include initiating an application request.

The mobile device 100 can be any computing device. In embodiments, mobile device 100 may be capable of web accessibility. Device 100 might take on a variety of forms, such as a personal computer (PC), a laptop computer, a mobile phone, a personal digital assistance (PDA), a CD player, an MP3 player, a video player, a handheld communications device, a workstation, any combination of these devices, or any other mobile device, including a device that is capable of web accessibility. In one embodiment, device 100 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

Device 100 may also include application 130, memory 140, and data structure 150. Application 130 may carry out various functional aspects and might take on a variety of forms. For example, application 130 might include configuration settings, might facilitate communicating data between multiple devices, might handle updates, include user settings, etc. Specifically, application 130 may be used to provide premium services, such as pay-per-view movies, to user 120 of mobile device 100 once user 120 has been authenticated using methods disclosed herein. Alternatively, application 130 may be used by a user to manage an account associated with the mobile device.

Memory 140 may include a data structure 150 that stores and facilitates the operation of application 130. For example, memory 140 may store data relating to an image and/or information displayed on user interface 110, as well as information related to the selected image portions. In addition, memory 140 may store firmware and other various software modules and components that might be present in mobile device 100. These modules and components may be used in embodiments of the present invention to present premium services on mobile device 100. Other examples of illustrative software include things such as the operating system of a phone, third-party applications such as games, programs to watch television on the device, ring tones, location-based services, contact information, and the like. In sum, FIG. 1 is not meant to indicate all, or even major, systems or components of mobile device 100. An overview of mobile device 100 is presented and certain components are listed so as to be able to refer to them throughout this disclosure.

Figure 2:
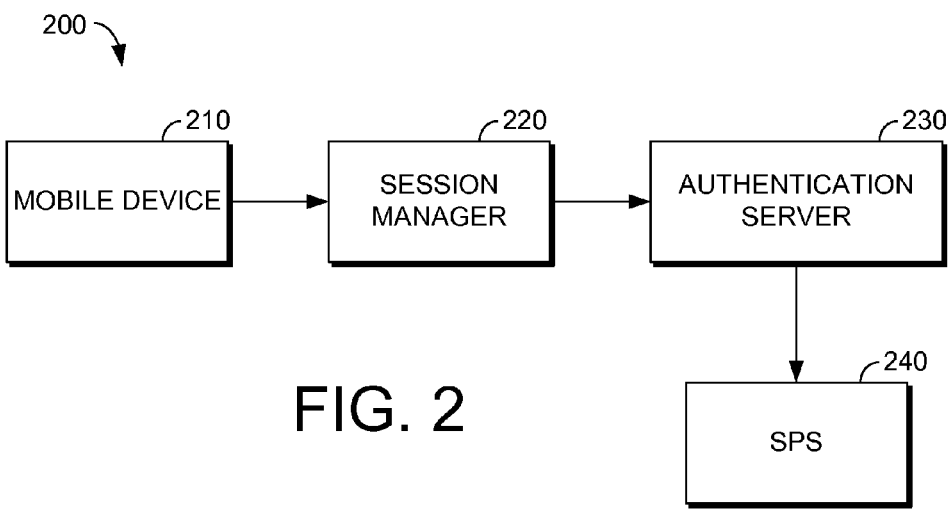
FIG. 2 is a schematic diagram of an illustrative system used to process an application-authentication request originating from a mobile device, in accordance with an embodiment of the present invention.

FIG. 2 is a schematic diagram 200 of an illustrative system used to process an application-authentication request originating from a mobile device, in accordance with an embodiment of the present invention. System 200 comprises mobile device 210, session manager 220, authentication server 230, and subscription profile server 240. Mobile device 210 may be mobile device 100 as described above. Further, mobile device 210 may be used by a user to request applications associated with premium services, such as pay-per-view movies.

Session manager 220 may direct application-authentication requests to an authentication server such as authentication server 230. Additionally, authentication server 230 may authenticate an application-authentication request based on user information associated with the request. In particular, authentication server 230 may check the user information against ban lists within authentication server 230. Further, authentication server 230 may query subscription profile server 240 to determine if the user information matches a user profile stored on the subscription profile server 240. Subscription profile server 240 stores data usage information associated with mobile devices that have accounts with a network service provider associated with a requested application. In particular, subscription profile server 240 may store allocated user information associated with mobile devices based on data plan subscriptions of the mobile devices.

Figure 3:
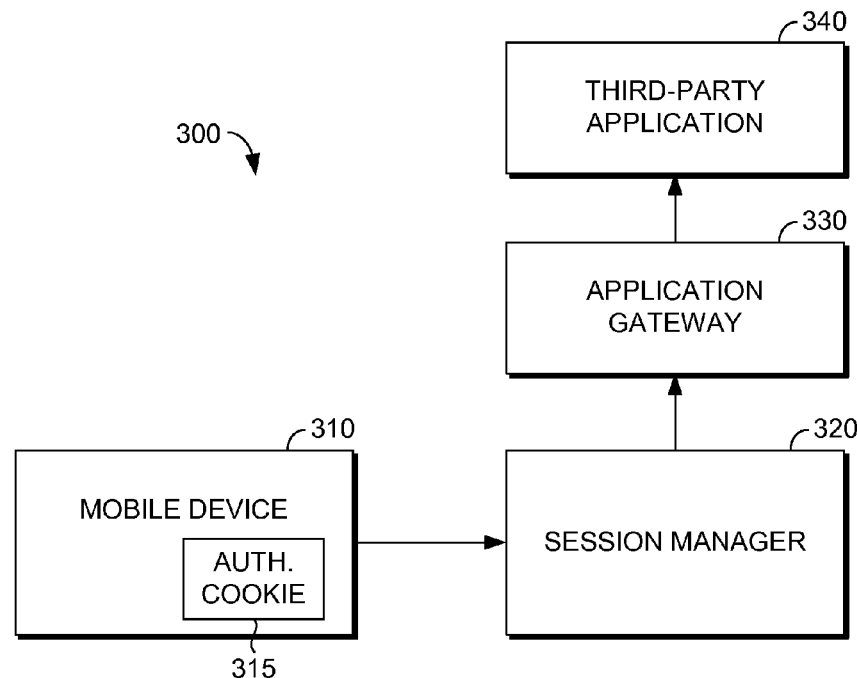
FIG. 3 is a schematic diagram of an illustrative system used to provide services to a mobile device based on a validated application-authentication request originating from a mobile device, in accordance with an embodiment of the present invention.

FIG. 3 is a schematic diagram 300 of an illustrative system used to provide services to a mobile device based on a validated application-authentication request originating from a mobile device, in accordance with an embodiment of the present invention. System 300 comprises mobile device 310, authentication cookie 315, session manager 320, application gateway 330, and third-party application 340. Mobile device 310 may be mobile device 100 as described above. Mobile device 310 may store an authentication cookie 315. As such, mobile device 310 may be used by a user to request applications associated with premium services, such as pay-per-view movies.

An application request from mobile device 310 may include authentication cookie 315 to allow access to third-party applications 340. In particular, session manager 320 may direct valid application requests to third-party applications 340. Further, third-party application 340 may be accessible via an application gateway, such as application gateway 330. Application gateway 330 may comprise a Media Access Gateway (MAG) or a Video Optimization Gateway (VOG). Additionally, a third-party application 340 may provide services in response to an application request processed via session manger 320.

Figure 4:
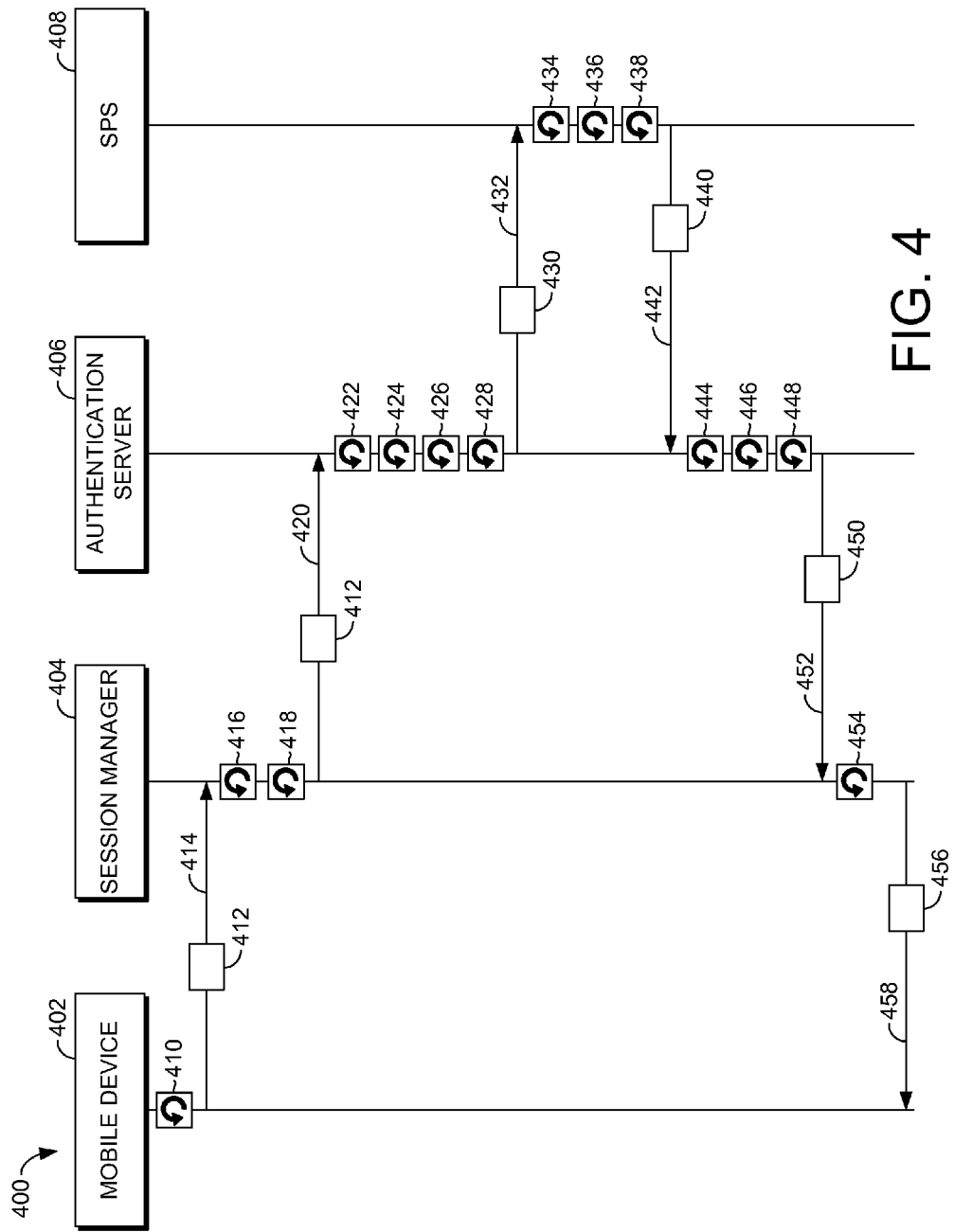
FIG. 4 is a process flow diagram showing an embodiment of a method of processing an application-authentication request originating from a mobile device, in accordance with an embodiment of the present invention.

FIG. 4 is a process flow diagram 400 showing an embodiment of a method of processing an application-authentication request originating from a mobile device, in accordance with an embodiment of the present invention. In particular, FIG. 4 provides flow diagram 400 for processing an application-authentication request received from a mobile device of a user without the use of certificates. Initially, an application-authentication request 412 is generated 410 at mobile device 402. In particular, application-authentication request 412 comprises an application identifier within the heading of application-authentication request 412. Additionally, encrypted user information is sent within application-authentication request 412. For example, user information may comprise an NAI, ESN, and time stamp. User information may be encrypted by an application key. The application key may be associated with the application of application-authentication request 412.

Application-authentication request 412 is sent 414 to session manager 404. For example, session manager 404 may comprise an F5 virtual server configured for HTTP and SSL client connections. Session manager 404 analyzes 416 application-authentication request 412. In particular, session manager 404 may check that application-authentication request 412 has a proper header. Session manager 404 may also analyze application-authentication request 412 to determine whether the IP address of mobile device 402 from which application-authentication request 412 originates is on a banned IP address list stored at session manager 404. Further, session manager 404 determines 418 application-authentication request 412 is valid and sends 420 application-authentication request 412 to authentication server 406.

At authentication server 406, an application associated with application-authentication request 412 is determined 422 based on the header within application-authentication request 412. Additionally, encrypted user information within application-authentication request 412 is decrypted 424 using an application key associated with the determined application. Once the encrypted user information is decrypted 424, the NAI, ESN, and time stamp of application-authentication request 412 is checked 426 for validity at authentication server 406. In particular, the NAI and ESN are checked against ban lists stored within authentication server 406. Further, the time stamp is checked to determine if the time stamp is within a threshold period of time for requests to be valid. For example, a valid request may be within the past 24 hours.

Additionally, authentication server 406 may generate 428 a validation request 430 that is sent 432 to subscription profile server (SPS) 408. In particular, validation request 430 includes the NAI and ESN of the application-authentication request 412. At SPS 408, the NAI and ESN are checked 434 against a user database to determine whether a user profile exists for the NAI and ESN. Additionally, if a user profile associated with the NAI and ESN exists within the user database, the user profile is checked 436 to determine whether the user profile is in good standing. SPS 408 then generates 438 a response 440 that includes determinations based on checks 434 and 436. Response 440 is sent 442 to authentication server 406.

At authentication server 406, response 442 is analyzed 444 to determine whether there is a user profile that is in good standing associated with the NAI and ESN of application-authentication request 412. Additionally, an authentication cookie is generated 446 at authentication server 406. The authentication cookie is placed within response 450 that is generated 448 at authentication server 406. Additionally, a mapping of the authentication cookie is placed within response 450. Response 450 is then sent 452 to session manager 404.

At session manager 404, the mapping of the authentication cookie is stripped 454 from response 450. The mapping of the authentication cookie is stored at session manager 404 in association with the IP address of mobile device 402. Additionally, response 456 is sent 458 to mobile device 402. Response 456 includes the authentication cookie, but does not include the mapping of the authentication cookie. The authentication cookie may be used to authenticate a subsequent application request, as described in FIG. 5.

Figure 5:
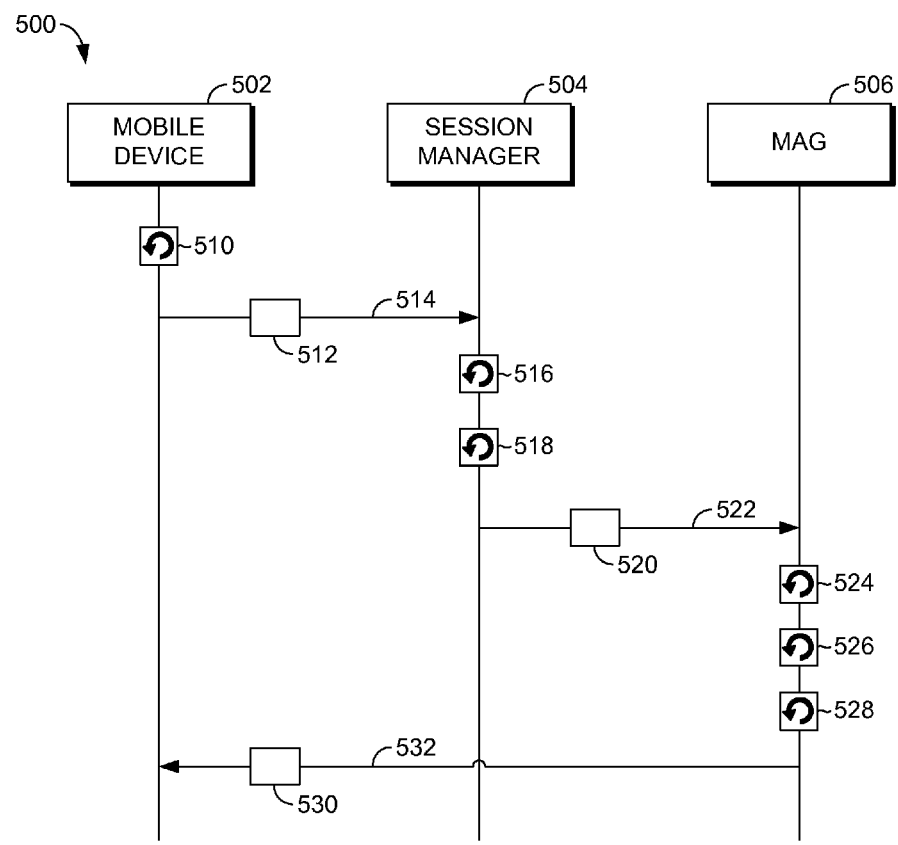
FIG. 5 is a process flow diagram showing an embodiment of a method of providing services to a mobile device based on a validated application-authentication request originating from a mobile device, in accordance with an embodiment of the present invention.

FIG. 5 is a process flow diagram 500 showing an embodiment of a method of providing services to a mobile device based on a validated application-authentication request originating from a mobile device, in accordance with an embodiment of the present invention. At 510, application request 512 is generated at mobile device 502. Application request 512 includes the authentication cookie received in response to an application-authentication request, such as application-authentication request 412 as discussed in FIG. 4. Application request 512 is sent 514 to session manager 504. At session manager 504, application request 512 is analyzed 516 to determine if application request 512 is valid. In particular, the IP address and authentication cookie of application request 512 are checked against valid concatenated cookies and IP addresses stored within session manager 504. Based on a determination that the IP address and authentication cookie of application request 512 are valid, a modified application request 520 is generated 518. In particular, modified application request 520 has no authentication cookie but has a proxy header that directs modified application request to application gateway 506.

Once modified application request 520 is sent 522 to application gateway 506, modified application request 520 is analyzed 524 to determine a third-party application to process modified application request 520. Application gateway 506 processes 526 modified application request 520 and generates 528 an application response 530 based on step 526. Application gateway 506 then sends 532 response 530 to mobile device 502.

Figure 6:
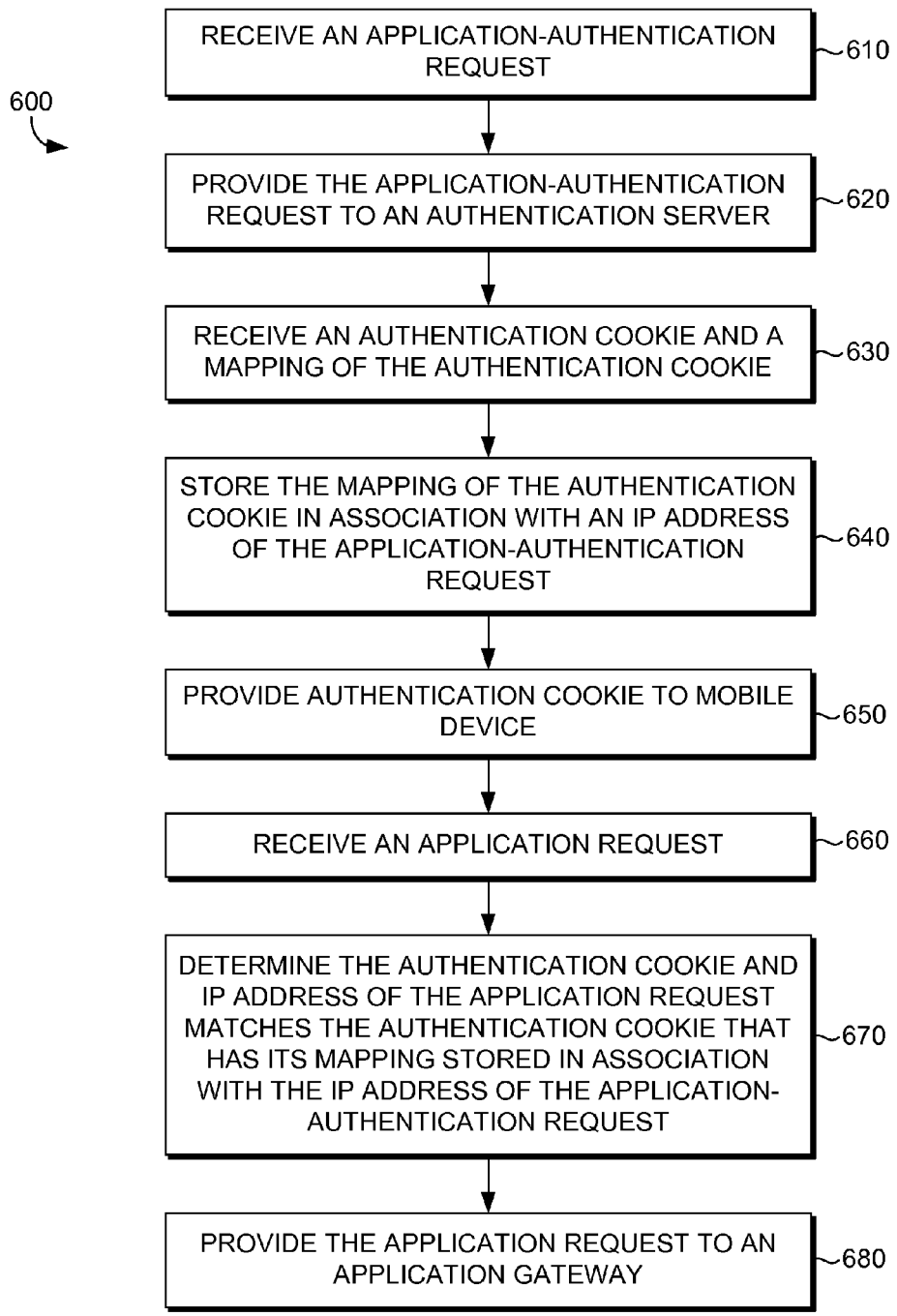
FIG. 6 is a flow diagram showing an embodiment of a method of processing an application-authentication request originating from a mobile device, in accordance with an embodiment of the present invention.

FIG. 6 is a flow diagram 600 showing an embodiment of a method of processing an application-authentication request originating from a mobile device, in accordance with an embodiment of the present invention. At step 610, an application-authentication request is received from a mobile device. The application authentication is received at a session manager. Additionally, the application-authentication request comprises encrypted user information. In particular, the user information may comprise an NAI, ESN, and time stamp associated with a mobile device. Additionally, the user information may be encrypted using an application key associated with the application-authentication request. At step 620, the application-authentication request is provided to an authentication server. The authentication server may decrypt the encrypted user information. In particular, the authentication server may decrypt the encrypted user information using an application key that is associated with application-authentication request. At step 630, an authentication cookie and a mapping of the authentication cookie is received from the authentication server. The authentication cookie is generated at the authentication server based on the authentication server decrypting the user information and receiving validation of the user information from a subscriber profile server.

At step 640, the mapping of the authentication cookie is stored in association with an IP address of the application-authentication request. At step 650, the authentication cookie is provided to the mobile device. At step 660, an application request is received from the mobile device. The application request comprises the authentication cookie. At step 670, the authentication cookie and an IP address of the application request is determined to match the authentication cookie that has its mapping stored in association with the IP address of the application-authentication request. At step 680, the application request is provided to an application gateway to process the application request. An application gateway may comprise a MAG gateway or a VOG gateway.

Additionally, the method may comprise query a ban list of the session manager to determine whether a portion of the user information is listed on the ban list. If no portion of the user information is listed on the ban list, a determination may be made that the user information is not banned. However, if a portion of the user information appears on the ban list, the processing of the application-authentication request may be halted.

Figure 7:
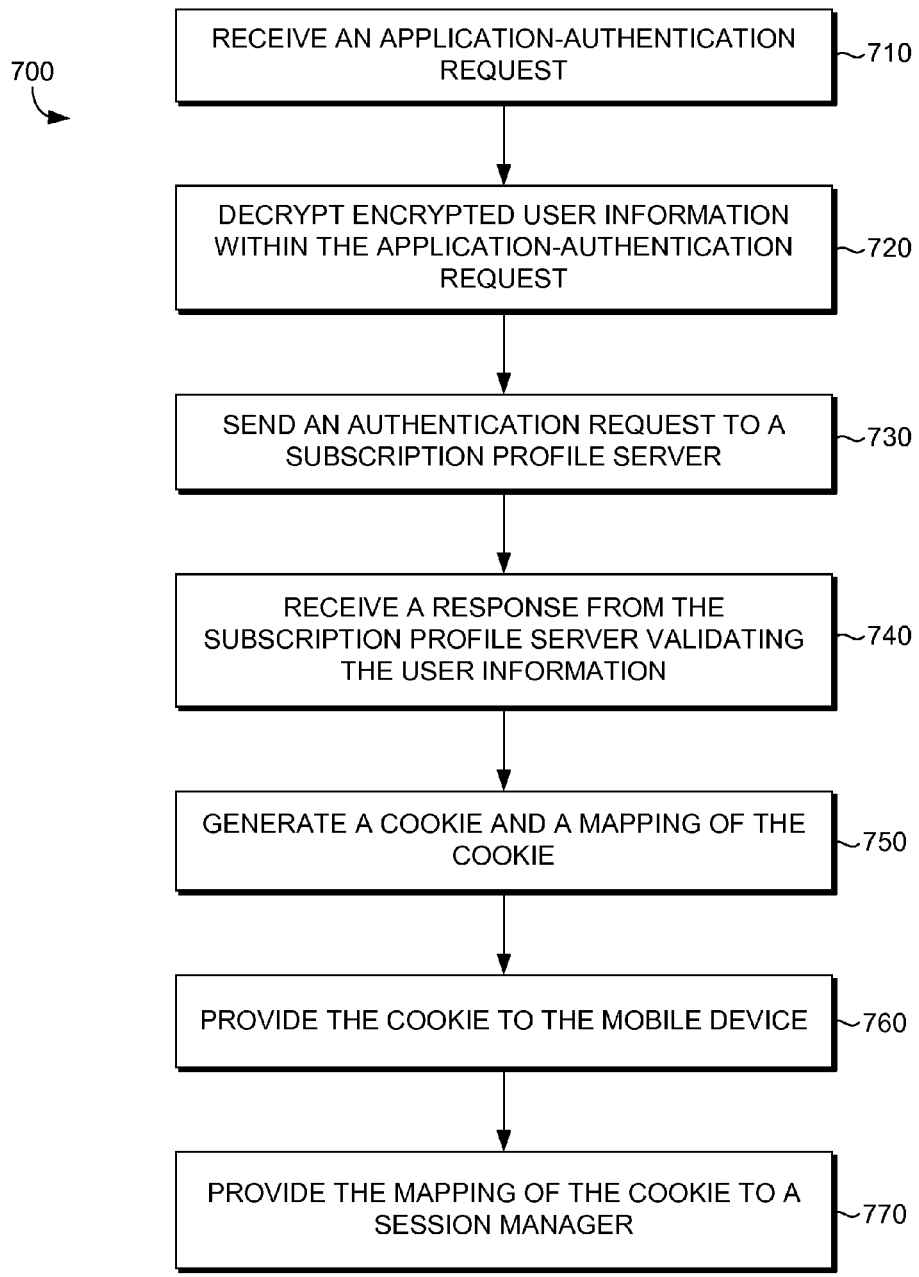
FIG. 7 is another flow diagram showing an embodiment of a method of processing an application-authentication request originating from a mobile device, in accordance with an embodiment of the present invention.

FIG. 7 is another flow diagram 700 showing an embodiment of a method of processing an application-authentication request originating from a mobile device. At step 710, an application-authentication request originating from a mobile device is received. The application-authentication request is received at an authentication server. The application-authentication request comprises encrypted user information. At step 720, the encrypted user information is decrypted using an application key associated with the application-authentication request. At step 730, an authentication request is sent to a subscription profile server, wherein the authentication request comprises the user information.

At step 740, a response is received from the subscription profile server that validates the user information is associated with a user profile stored at the subscription profile server. The response from the subscription profile server may also validate that the user profile is in good standing. In particular, the user profile may be determined to be in good standing when there are no outstanding debts associated with the user profile. Additionally, the user profile may be determined to be in good standing when the user profile has been active for a pre-determined amount of time.

At step 750, a cookie and a mapping of the cookie is generated based on the response from the subscription profile server that validates the user information. At step 760, the cookie is provided to the mobile device. At step 770, the mapping of the cookie is provided to a session manager to authenticate a subsequent application request from the mobile device. The mapping of the cookie may be provided to the session manager within a proxy authorization heading.

The method may further comprise querying a ban list of the authentication server to determine whether a portion of the user information is listed on the ban list. If no portion of the user information is listed on the ban list, a determination may be made that the user information is not banned. However, if a portion of the user information appears on the ban list, the processing of the application-authentication request may be halted.

Figure 8:
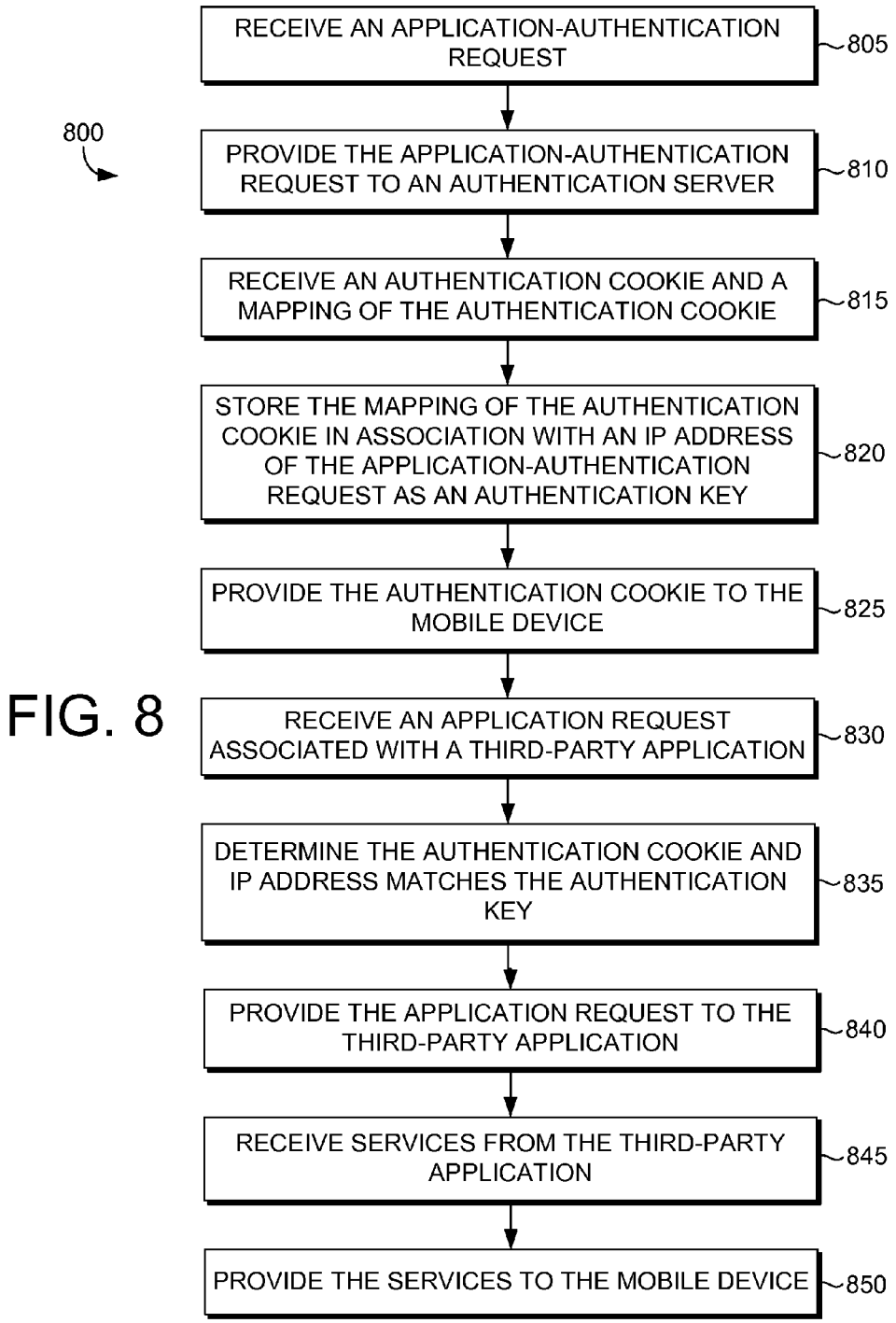
FIG. 8 is a further flow diagram showing an embodiment of a method of processing an application-authentication request originating from a mobile device, in accordance with an embodiment of the present invention.

FIG. 8 is a further flow diagram 800 showing an embodiment of a method of processing an application-authentication request originating from a mobile device. At step 805, an application-authentication request is received from a mobile device. The application-authentication request comprises encrypted user information. Additionally, the application-authentication request may be associated with the third-party application. At step 810, the application-authentication request is provided to an authentication server.

At step 815, an authentication cookie and a mapping of the authentication cookie is received from the authentication server. The authentication cookie is generated at the authentication server based on the authentication server decrypting the user information and receiving validation of the user information from a subscriber profile server. The authentication server may receive validation that the user information stored at the subscriber profile server is in good standing with the third-party application. At step 820, the mapping of the authentication cookie is stored in association with an IP address of the application-authentication request as an authentication key. The authentication key may be valid for a pre-determined period of time. At step 825, the authentication cookie is provided to the mobile device.

At step 830 an application request associated with a third-party application is received from a mobile device. The application request comprises the authentication cookie. At step 835, the authentication cookie and an IP address of the application request is determined to match the authentication key. At step 840, the application request is provided to the third-party application. At step 845, services from the third-party application are received in response to the application request. The services received from the third-party application may be based on the validation that the user information stored at the subscriber profile server is in good standing with the third-party application. The services received from the third-party application may be premium services. At step 850, the services are provided to the mobile device.

Additionally, providing the application request to the third-party application may comprise removing the authentication cookie from the application request. Providing the application request may also comprise adding a header directing the application request to the third-party application. Further, providing the application request may comprise sending the request to the third-party application via an application gateway. An application gateway may comprise a MAG or a VOG.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:
1. A non-transitory computer-readable storage media ("media") having computer-executable instructions embodied thereon that, when executed, facilitate a method of processing an application-authentication request originating from a mobile device, the method comprising:

receiving, at a session manager, an application-authentication request from a mobile device, wherein the application-authentication request comprises encrypted user information encrypted using an application key associated with the application-authentication request;

providing the application-authentication request to an authentication server;

receiving an authentication cookie and a mapping of the authentication cookie from the authentication server, wherein the authentication cookie is generated at the authentication server based on the authentication server decrypting the user information using the application key associated with the application-authentication request and receiving validation of the user information from a subscriber profile server;

storing the mapping of the authentication cookie in association with an Internet Protocol (IP) address of the application-authentication request;

providing the authentication cookie to the mobile device;

receiving an application request from the mobile device, wherein the application request comprises the authentication cookie;

determining that the authentication cookie and an IP address of the application request matches the authentication cookie that has its mapping stored in association with the IP address of the application-authentication request; and providing the application request to an application gateway to process the application request.

2. The media of claim 1, wherein the application gateway is a Media Access Gateway (MAG).

3. The media of claim 1, wherein the application gateway is a Video Optimization Gateway (VOG).

4. The media of claim 1, further comprising:

querying a ban list of the session manager to determine whether a portion of the user information is listed on the ban list; and determining no portion of the user information appears on the ban list of the session manager.

5. A non-transitory computer-readable storage media ("media") having computer-executable instructions embodied thereon that, when executed, facilitate a method of processing an application-authentication request originating from a mobile device, the method comprising:

receiving an application-authentication request from a mobile device, wherein the application-authentication request comprises encrypted user information;

providing the application-authentication request to an authentication server;

receiving an authentication cookie and a mapping of the authentication cookie from the authentication server, wherein the authentication cookie is generated at the authentication server based on the authentication server decrypting the user information and receiving validation of the user information from a subscriber profile server;

storing the mapping of the authentication cookie in association with an Internet Protocol (IP) address of the application-authentication request as an authentication key;

providing the authentication cookie to the mobile device;

receiving, from the mobile device, an application request associated with a third-party application, wherein the application request comprises the authentication cookie;

determining that the authentication cookie and an IP address of the application request matches the authentication key;

removing the authentication cookie from the application request;

sending the application request to the third-party application via an application gateway;

receiving services from the third-party application in response to the application request; and providing the services to the mobile device.

6. The media of claim 5, wherein the application-authentication request is associated with the third-party application.

7. The media of claim 6, wherein the authentication server receives validation that the user information from the subscriber profile server is in good standing with the third-party application.

8. The media of claim 7, wherein the services received from the third-party application are based on the validation that the user information from the subscriber profile server is in good standing with the third-party application.

9. The media of claim 5, wherein the services received from the third-party application are premium services.

10. The media of claim 5, wherein the authentication key is valid for a pre-determined period of time.

11. The media of claim 5 further comprising:

in response to removing the authentication cookie from the application request, adding a header directing the application request to the third-party application.

12. The media of claim 11, wherein the application gateway comprises a Media Access Gateway (MAG).

* * * * *